US008249592B1

(12) United States Patent
Nielsen et al.

(10) Patent No.: US 8,249,592 B1
(45) Date of Patent: Aug. 21, 2012

(54) AUTHENTICATING A MOBILE STATION THAT COMMUNICATES THROUGH A LOCAL PREMISES WIRELESS GATEWAY

(75) Inventors: Douglas Jon Nielsen, Nepean (CA); Anthony Robert Jones, Kanata (CA); Elaine Ee Lay Quah, Ingleburn (AU); Robert R. Swanson, Allen, TX (US)

(73) Assignee: Rockstar Bidco, LP, New York, NY (US)

( * ) Notice: Subject to any disclaimer, the term of this patent is extended or adjusted under 35 U.S.C. 154(b) by 514 days.

(21) Appl. No.: 12/275,629

(22) Filed: Nov. 21, 2008

Related U.S. Application Data

(60) Provisional application No. 60/989,571, filed on Nov. 21, 2007.

(51) Int. Cl.
*H04W 4/00* (2009.01)
(52) U.S. Cl. ............ 455/435.1; 455/435.2; 455/445; 455/552.1; 370/352; 370/310.2; 370/338

(58) Field of Classification Search .......... 455/435.1, 455/435.2, 432.1, 552.1, 411, 445; 370/352, 370/310.2, 338, 339
See application file for complete search history.

(56) References Cited

U.S. PATENT DOCUMENTS

| 2003/0027569 A1* | 2/2003 | Ejzak ........................ 455/432 |
| 2003/0043762 A1* | 3/2003 | Pang et al. .................. 370/328 |

* cited by examiner

*Primary Examiner* — Temica M Beamer
(74) *Attorney, Agent, or Firm* — Withrow & Terranova, PLLC

(57) ABSTRACT

To authenticate a mobile station that is able to access packet-switched services in a packet-switched services network, an intermediate server receives a registration request from a local premises wireless gateway on behalf of the mobile station. In response to the registration request, the intermediate server performs an authentication procedure with an authentication infrastructure in a circuit-switched network, where the authentication infrastructure contains authentication information relating to the mobile station to enable authentication of the mobile station.

21 Claims, 2 Drawing Sheets

AUTHENTICATING A MOBILE STATION THAT COMMUNICATES THROUGH A LOCAL PREMISES WIRELESS GATEWAY

CROSS-REFERENCE TO RELATED APPLICATIONS

This application claims the benefit under 35 U.S.C. §119(e) of U.S. Provisional Application Ser. No. 60/989,571, entitled "Mobile Femtocell Authentication," filed Nov. 21, 2007, which is hereby incorporated by reference.

TECHNICAL FIELD

The invention relates generally to authenticating a mobile station that communicates through a local premises wireless gateway.

BACKGROUND

Many types of communications can be performed over data networks (wireless and/or wireline networks), including electronic mail, web browsing, file downloads, electronic commerce transactions, voice or other forms of real-time, interactive communications, and others. To enable the establishment of communications sessions in a network, various control functions are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP packet-switched multimedia services, including audio, video, text, chat, or any combination of the foregoing.

In the 3GPP2 (Third Generation Partnership Project 2) context, the equivalent of the IP multimedia subsystem is sometimes referred to as a multimedia domain (MMD) network. In the wireline context, the equivalent of an IP multimedia subsystem is sometimes referred to as a Next Generation Networks (NGN).

Services of a packet-switched services network (e.g., IMS network, MMD network, or NGN network) may be accessed by mobile users. A mobile user may be located in a home or small business environment ("local premises"). To access an external network such as the packet-switched services network, the mobile user connects through a wireless "home gateway" in the local premises. In one example, wireless home gateways can be femtocell base stations.

The wireless home gateways may be part of a wireless access network that the mobile user is a subscriber of. In some cases, the wireless access network is a legacy circuit-switched wireless access network, such as a CDMA (Code Division Multiple Access) 1xRTT network. Because of the substantial investment by service providers in legacy circuit-switched wireless access networks, it is expected that it will be some time before service providers will be able to completely transition to packet-switched wireless access networks.

Before service can be provided to a mobile user, the mobile user has to be first authenticated. However, authentication in the context where a subscriber of a legacy circuit-switched network is attempting to access services of a packet-switched services network raises several issues. Typically, each of the circuit-switched wireless access network and packet-switched services network is associated with its respective separate authentication infrastructure. Current standards call for modification of the packet-switched services network to support authentication of mobile users that are subscribers of circuit-switched wireless access networks. Also, to support authentication by the packet-switched services network, authentication credentials maintained by the circuit-switched wireless access network may have to be copied into the authentication infrastructure of the packet-switched services network. If a service provider of the circuit-switched wireless access network has a large number of subscribers (e.g., hundreds of thousands or millions of subscribers), copying authentication credentials from the circuit-switched wireless access network to the packet-switched services network can be very inefficient. Moreover, having to maintain authentication credentials in two different networks raises the challenge of having to maintain synchronization of the copies of the authentication credentials. Also, having to modify the infrastructure of the packet-switched services network for the purpose of authenticating subscribers of legacy circuit-switched wireless access networks adds unnecessary complexity and cost.

SUMMARY

In general, according to an embodiment, a method of authenticating a mobile station includes using an intermediate server to perform an authentication procedure on behalf of a mobile station (which is connected to a local premises wireless gateway) with an authentication infrastructure in a circuit-switched network. Once the mobile station is authenticated based on authentication information received by the intermediate server in the authentication procedure, the mobile station is able to access services provided by a packet-switched services network through the local premises wireless gateway.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

In general, according to some embodiments, an efficient mechanism is provided to authenticate a mobile user that is a subscriber of a circuit-switched wireless access network to enable the mobile user to access packet-switched services provided by a packet-switched services network. The mechanism for authenticating the mobile user involves provisioning an intermediate server that is able to access authentication credentials of the mobile user that are maintained by an authentication infrastructure of the circuit-switched wireless access network. In this manner, authentication credentials that are maintained by the circuit-switched wireless access network do not have to be copied to the packet-switched services network to enable authentication of mobile users desiring to access the packet-switched services network. Moreover, the packet-switched services network does not have to be modified to enable authentication of mobile users that are subscribers of circuit-switched wireless access networks.

Figure 1:
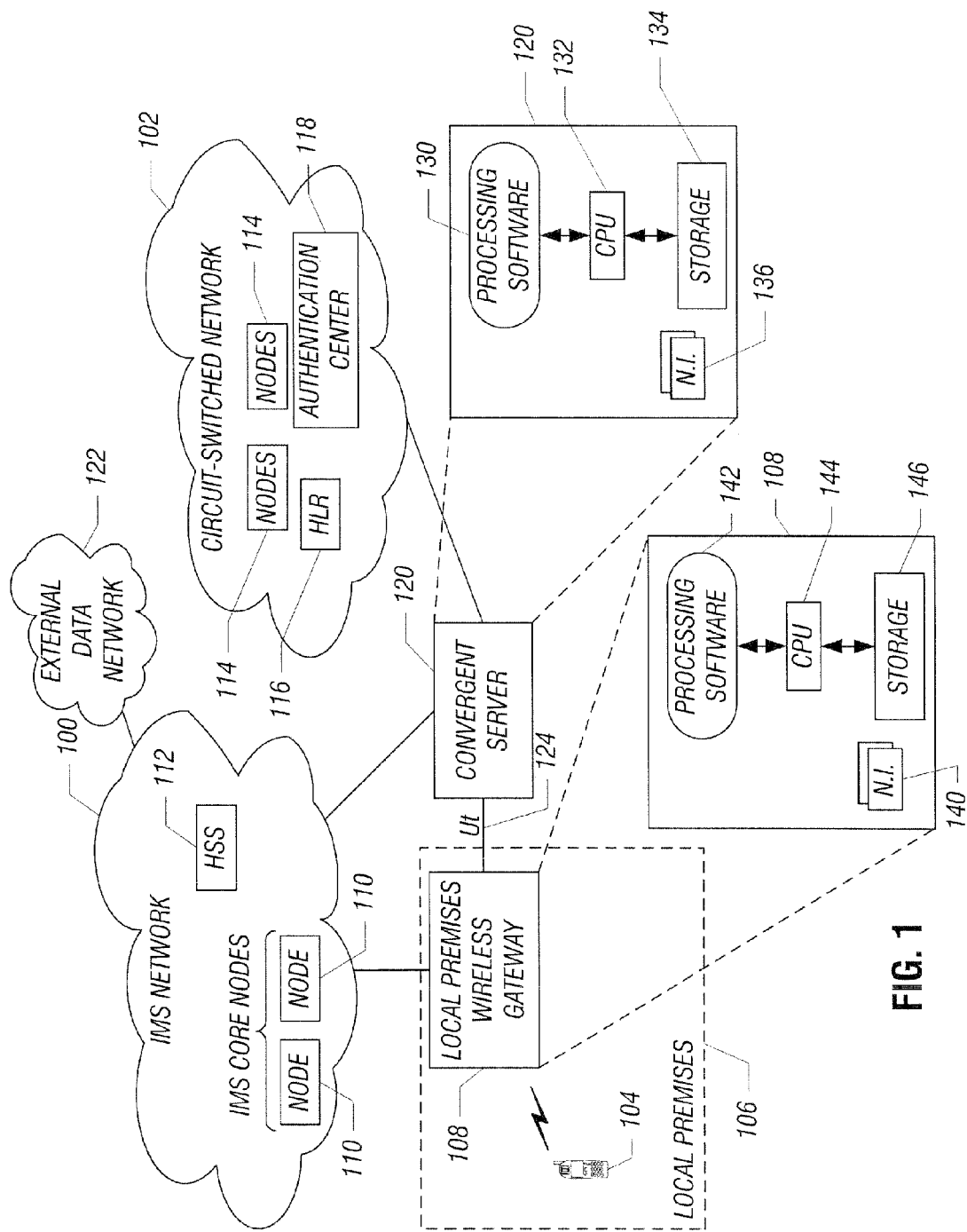
FIG. 1 is a block diagram of an exemplary communications network that includes a circuit-switched wireless access network and a packet-switched services network along with a local premises wireless gateway that is wirelessly connected to a mobile station, in which authentication of the mobile station is performed in accordance with an embodiment.

FIG. 1 illustrates an exemplary communications network that includes a packet-switched services network 100 and a circuit-switched network 102. In addition, a mobile station 104 is located in local premises 106. Local premises 106 can be a home or an office. Generally, the term "local premises" refers to any relatively small environment that either has a small geographic spread or that is intended to accommodate a relatively small number of mobile users. Local premises are smaller than cells or cell sectors typically provided by wireless access networks.

The mobile station 104 within the local premises 106 is able to wirelessly communicate with a local premises wireless gateway 108 (also referred to as a "home gateway") that allows mobile stations within the local premises 106 to access an external network, in this case the packet-switched services network 100 or the circuit-switched network 102.

One example of the packet-switched services network 100 is the Internet Protocol (IP) multimedia subsystem (IMS) network that includes various control functions for provision of IP multimedia services, including audio, video, text, chat, or any combination of the foregoing. IMS is defined by the Third Generation Partnership Project (3GPP). Alternatively, the packet-switched services network 100 can be a multimedia domain (MMD) network defined by 3GPP2, or a Next Generation Network (NGN) for use in the wireline context.

An example of the circuit-switched network 102 is a 1xRTT wireless access network according to CDMA 2000 (Code Division Multiple Access 2000) as defined by 3GPP2. Other types of circuit-switched networks can be employed in other implementations.

In the ensuing discussion, reference is made to "IMS network 100." It is contemplated that in alternative embodiments, the same techniques can be applied to other types of packet-switched services networks.

One example of the local premises wireless gateway 108 is a femtocell base station. A femtocell base station is a wireless access point that is designed for use in residential or small business environments. Generally, the local premises wireless gateway 108 is a wireless access point that is designed to work in a smaller environment than wireless base stations that are designed to provide services in cells or cell sectors.

The IMS network 100 includes IMS core nodes 110 to provide various packet-switched services supported by the IMS network. For example, the IMS core nodes 110 can be nodes used for establishing Session Initiation Protocol (SIP) communications sessions. SIP is a protocol used for establishing IP multimedia sessions. SIP is described in RFC (Request for Comments) 3261, entitled "SIP: Session Initiation Protocol," dated June 2002.

As further depicted, the IMS network 100 includes a home subscriber server (HSS) 112, which stores authentication credentials and other user profile information for subscribers of the IMS network 100.

The circuit-switched network 102 includes circuit-switched network nodes 114 to provide services of the circuit-switched network 102. Moreover, the circuit-switched network 102 includes a home location register (HLR) 116, which is a central database of the circuit-switched network 102 that contains details of each mobile subscriber that is authorized to use the circuit-switched network 102. The circuit-switched network 102 also includes an authentication center 118 that controls the authentication process on behalf of the circuit-switched network 102 for subscribers of the circuit-switched network 102. Often, the authentication center 118 is co-located with the HLR 116, and the combination is referred to as the HLR/AC. Alternatively, the authentication center 118 can be a standalone network entity that serves one or more HLRs.

Although referred to as the HLR 116 and authentication center 118, note that in alternative implementations, other types of network entities can be used for storing subscriber information and to control authentication on behalf of subscribers. More generally, the HLR 116 and/or authentication center 118 (or any other type of network entity that performs similar tasks) is referred to as an "authentication infrastructure" of the circuit-switched network 102. The authentication infrastructure is used for performing authentication of a mobile station associated with a subscriber of the circuit-switched network 102.

Similarly, the HSS 112 and possibly other nodes of the IMS network 100 can be considered the authentication infrastructure of the IMS network 100. An authentication infrastructure of the IMS network 100 stores authentication information that allows for authentication of a subscriber of the IMS network 100.

Since the mobile station 104 belongs to a mobile user that is a subscriber of the circuit-switched network 102, the authentication credentials for the mobile station 104 in the local premises 106 may be stored in the authentication infrastructure of the circuit-switched network 102, but not in the IMS network 100. In other words, the authentication credentials of the mobile station 104 is stored in the HLR 116 in the circuit-switched network 102, but not in the HSS 112 of the IMS network 100.

In accordance with some embodiments, although the mobile station 104 is able to access packet-switched services provided by the IMS network 100 for voice and other types data services, the mobile station 104 is authenticated using the authentication infrastructure of the circuit-switched network 102. In this way, the IMS network 100 does not have to be modified to enable authentication of the mobile station 104, which reduces costs associated with deployment of the IMS network 100. In addition, authentication credentials of subscribers of a legacy circuit-switched network do not have to be copied to the packet-switched services network to enable provision of packet-switched services to legacy circuit-switched network subscribers.

Techniques according to some embodiments also allow in-bound roaming mobile stations (roaming in the local premises network) to use the packet-switched services network. A benefit provided is that there is no need to have pre-knowledge (in the packet-switched services network) of such a roaming mobile station. A service operator of the packet-switched services network 100 has no knowledge of a roaming 25 mobile station; therefore, the service operator's HSS would not have any pre-provisioned authentication credentials for such roaming mobile station. Without the technique according to some embodiments, the packet-switched services network 100 would not be able to obtain authentication credentials for authenticating the roaming mobile station.

A convergent server 120 can be used to allow for authentication of the mobile station 104 to be performed using the authentication infrastructure of the circuit-switched network 102. The convergent server 120 bridges multiple different types of networks, which in the case of FIG. 1 include the local premises network, the IMS network 100, and the circuit-switched network 102. The convergent server 120 can be based on the Wireless Mobility Gateway (WMG) equipment provided by Nortel Networks Ltd. More generally, the convergent server can be referred to as an "intermediate server" 120 that bridges various networks depicted in FIG. 1.

As depicted in FIG. 1, the convergent server 120 can include network interfaces 136 to allow the convergent server 120 to be connected to the various different networks, including the local premises network, IMS network 100, and circuit-switched network 102. Also, the convergent server 120 includes processing software 130 executable on one or more central processing units (CPUs) 132. The CPU(s) 132 is (are) connected to storage 134. The processing software 130 can perform various tasks associated with the convergent server 120. Among those tasks are authentication tasks for authenticating a mobile user by interacting with the authentication infrastructure of the circuit-switched network 102 such that the mobile user can access services provided by the IMS network 100.

The local premises wireless gateway 108 also includes network interfaces 140 to allow the local premises wireless gateway 108 to communicate with the IMS network 100 and the convergent server 120. Also, the local premises wireless gateway 108 includes processing software 142 executable on one or more CPUs 144. The 25 CPU(s) 144 is (are) connected to storage 146. The processing software 142 can perform various tasks associated with the local premises wireless gateway 108.

In accordance with some embodiments, an IP-based interface 124 can be provided between the local premises wireless gateway 108 and the convergent server 120. The local premises wireless gateway 108 is able to communicate with the convergent server 120 over the IP-based interface 124 to exchange messages for authenticating the mobile station 104 using the authentication infrastructure of the circuit-switched network 102. In one specific embodiment, the interface 124 is a Ut interface, as defined by the 3GPP TS 23.228 Specification.

Alternatively, instead of defining a direct interface (124) between the local premises wireless gateway 108 and the convergent server 120, authentication messages for authenticating the mobile station 104 using the authentication infrastructure of the circuit-switched network 102 can be tunneled through the IMS network 100 between the local premises wireless gateway 108 and the convergent server 120. Tunneling a particular message through the IMS network 100 means that the particular message is encapsulated within a larger message that is carried in the IMS network 100 for the purpose of communicating the particular message between the local premises wireless gateway 108 and the convergent server 120. The tunneled particular message is actually not processed in the IMS network 100; effectively, the IMS network 100 behaves purely as a carrier of the particular message between the local premises wireless gateway 108 and the convergent server 120.

In one embodiment, if a direct Ut interface (124) is provided between the local premises wireless gateway 108 and the convergent server 120, Hypertext Transfer Protocol (HTTP) messaging, or some other type of messaging, can be used to carry authentication messages between the local premises wireless gateway 108 and the convergent server 120. Alternatively, if the Ut interface 124 is not provided, then SIP messages or INFO messages can be used to carry authentication messages between the local premises wireless gateway 108 and convergent server 120 by tunneling through the IMS network 100. Authentication information can be contained in the body of a SIP message, for example.

In general, when the local premises wireless gateway 108 initially powers up, the local premises wireless gateway 108 registers itself and authenticates itself with the IMS network 100. As part of the registration of the local premises wireless gateway 108, the IMS network 100 sends a third-party registration to the convergent server 120, in response to which the convergent server 120 subscribes for registration events against the particular local premises wireless gateway 108. In other words, registration requests submitted by the local premises wireless gateway 108 on behalf of mobile stations connected to the local premises wireless gateway are directed to the convergent server 120.

When a mobile station 104 first enters the local premises 106 (or first powers up within the local premises 106), the mobile station 104 registers over the air with the local premises wireless gateway 108. In response, the local premises wireless gateway 108 initiates an authentication sequence over the Ut interface 124 or, alternatively, through the IMS network 100 (by tunneling authentication information in messages communicated through the IMS network 100). As part of the authentication sequence, the convergent server 120 accesses the authentication infrastructure of the circuit-switched network 102 to obtain authentication information of the mobile station 104, for the purpose of authenticating the mobile station 104.

Once the mobile station 104 is authenticated, the local premises wireless gateway 108 can register a contact address for the mobile station 104 with the circuit-switched network 102 to allow the circuit-switched network 102 to route calls targeted to the mobile station 104 and received at the circuit-switched network 102 through the packet-switched services network 100 to the mobile station 104. As part of the contact address registration sequence, the convergent server 120 receives a registration event and registers with the HLR 116 in the circuit-switched network 102 on behalf of the mobile station. Any calls directed to the mobile station 104 that are received by the circuit-switched network 102 will be directed through the convergent server 120, IMS network 100, and the local premises wireless gateway 108 to the mobile station 104.

Figure 2:
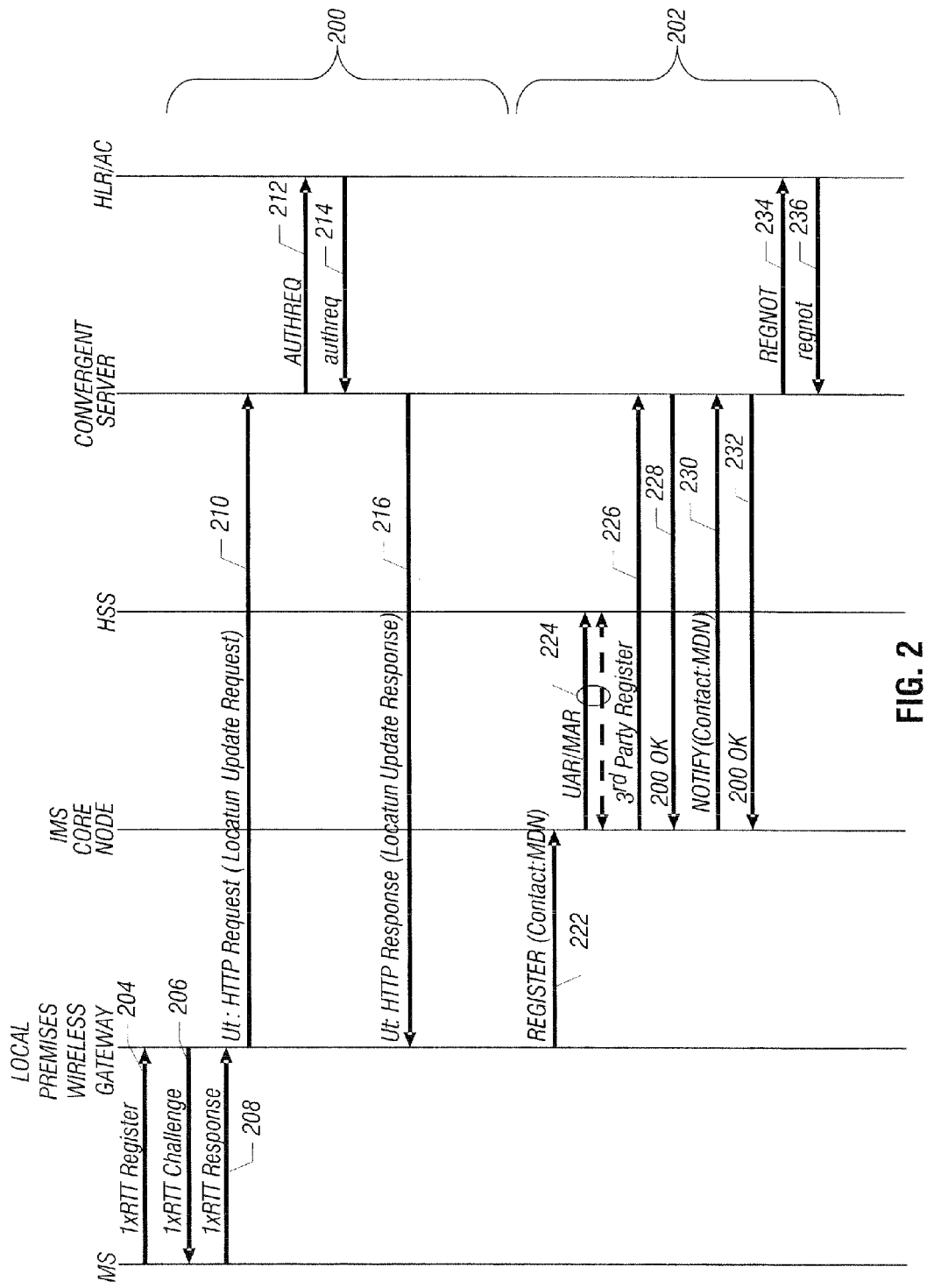
FIG. 2 is a message flow diagram of a procedure that includes authenticating a mobile station and registering a contact address of the mobile station, in accordance with an embodiment.

FIG. 2 shows an exemplary message flow diagram for authenticating the mobile station 104 and to register a contact address for the mobile station. The message flow depicted generally as 200 is the authentication procedure, and the message flow depicted generally as 202 is the contact address registration procedure.

To perform authentication, the mobile station sends (at 204) a registration request to the local premises wireless gateway 108. In one example, the registration request is in the form of a 1xRTT Register message, which is a message defined by CDMA 2000 for performing registration of a CDMA mobile station. In other embodiments, the mobile station can send another type of register message to the local premises wireless gateway 108.

In response to the registration request from the mobile station, the local premises wireless gateway sends a 1xRTT Challenge message (at 206) to the mobile station. The 1xRTT Challenge message is used to indicate to the mobile station that an authentication challenge has been issued and that the mobile station has to provide its authentication credentials to enable authentication of the mobile station. The mobile station responds to the 1xRTT Challenge message by sending (at 208) a 1xRTT Response message to the local premises wireless gateway 108. The 1xRTT Response message contains information of the mobile station that can be used to authenticate the mobile station. In other implementations, other types of messages can be used to cause the mobile station to send its authentication credentials.

Upon receipt of the authentication credentials in the 1xRTT Challenge Response message, the local premises wireless gateway sends (at 210) a message over the Ut interface to the convergent server 120 to convey a registration request. In one embodiment, the registration request is provided in the form of a Location Update Request encapsulated in an HTTP Request message. The Location Update Request is described in the Interoperability Specification for CDMA 2000. In FIG. 2, the Location Update Request contains the authentication credentials received from the mobile station by the local premises wireless gateway.

In other implementations, other types of messages can be sent from the local premises wireless gateway to the convergent server 120.

In response to receipt of the Location Update Request sent at 210, the convergent server 120 sends (at 212) an authorization request (AUTHREQ) message to the HLR/AC. The AUTHREQ message is an authentication request defined by ANSI-41 (American National Standards Institute-41) to validate a mobile station. ANSI-41 is a standard used for identifying and authenticating users. In other implementations, other types of authentication messages can be employed. The HLR/AC responds to the AUTHREQ message by sending (at 214) an authreq message to the convergent server 120. The authreq message is used to provide authentication information of the mobile station 104 (maintained in the HLR 116 of the circuit-switched network 102) back to the convergent server 120 so that the convergent server 120 can perform authentication of the mobile station.

Upon receipt of the authreq message (214), the convergent server compares the authentication credentials received from the local premises wireless gateway with the authentication credentials received from the HLR. If a match is found, then the mobile station is authenticated, and the convergent server 120 sends (at 216), over the Ut interface, an HTTP Response that contains a Location Update Response message (which is responsive to the Location Update Request message sent at 210). The Location Update Response message is an acknowledgment to the local premises wireless gateway 108 that the mobile station has been authenticated, such that the local premises wireless gateway 108 can allow the mobile station 104 to access the packet-switched services of the packet-switched services network 100.

Instead of using the Ut interface, it is noted that similar messages as depicted in FIG. 2 can be tunneled through the IMS network 100 between the local premises wireless gateway 108 and convergent server 120. In other words, messages sent at 210 and 216 can be tunneled through the IMS network 100 between the local premises wireless gateway 108 and the convergent server 120.

In the authentication procedure 200 depicted in FIG. 2, the convergent server 120 is able to interact with the authentication infrastructure of the circuit-switched network 102 to obtain authentication information of the mobile station 104 so that the convergent server 120 can authenticate the mobile station 104. Such authentication can be performed without having to involve the IMS network 100 (except to tunnel authentication messages 210 and 216 in the embodiment in which tunneling is used). In this way, an efficient mechanism is provided to authenticate a mobile station that is a subscriber of a legacy circuit-switched network for the purpose of accessing packet-switched services provided by a packet-switched services network.

After authentication of the mobile station 104, registration of the contact address of the mobile station 104 can be performed to register the mobile station with the HLR 116 in the circuit-switched network 102, such that any calls directed to the mobile station 104 and received by the circuit-switched network 102 can be directed to the mobile station 104 through the convergent server 120, IMS network 100, and local premises wireless gateway 108.

In the contact address registration procedure 202, the local premises wireless gateway 108 sends (at 222) a SIP REGISTER message to SIP core node(s) that is located in the IMS network 100. The REGISTER message contains the contact address of the mobile station, which in one embodiment is the mobile directory number (MDN) of the mobile station. Note that multiple SIP core nodes in the IMS network 100 can be involved in performing registration.

Examples of SIP core nodes in the IMS network 100 include a proxy call session control function (P-CSCF), which is the first SIP aware control contact point for a network entity desiring to access the IMS network. The P-CSCF in turn communicates SIP signaling with an interrogating CSCF (I-CSCF) or serving CSCF (S-CSCF) in the IMS network 100. An I-CSCF is the contact point within a service operator's network for connections destined to destinations in the service operator's network. Example tasks performed by the I-CSCF include handling initial registration by interrogating an HSS, routing of a call control message received from another network towards an S-CSCF, and other tasks. An S-CSCF handles session control within the IMS network 100 on behalf of other network entities.

The SIP core node(s) perform(s) (at 224) a UAR/MAR exchange with the HSS 112 in the IMS network 100. The UAR (User Authorization Request) message is used for identifying an S-CSCF. The UAR message is sent to the HSS 112, which responds with a UAA (User Authorization Answer) message that identifies the S-CSCF. Once the S-CSCF is identified, the REGISTER message received at 222 containing the contact address of the mobile station is forwarded to the S-CSCF, which in turns sends an MAR (Multimedia Authentication Request) message to the HSS to ask for authorization data and to check for access permission of the mobile station 104. The HSS responds to the MAR message with an MAA (Multimedia Authentication Answer) message that identifies the convergent server 120.

Once the convergent server 120 is identified, a SIP core node (e.g., S-CSCF) sends (at 226), a third-party registration message to the convergent server 120 to notify the convergent server that registration of a network entity is desired (in this case, the mobile station 104). A 200 OK message is returned (at 228) from the convergent server 120 to the IMS core node(s) in response to the third-party registration. Next, a SIP NOTIFY message is sent (at 230) from the IMS core node to the convergent server 120, where the NOTIFY message contains the contact address (e.g., MDN) of the mobile station. The convergent server acknowledges the NOTIFY message with a 200 OK message (sent at 232).

Next, the convergent server 120 sends (at 234) a registration notification (REGNOT) message to the HLR/AC. The REGNOT message contains the MDN of the mobile station. The HLR 116 in the circuit-switched network 102 will be updated with the contact address of the mobile station such that any calls received by the circuit-switched network and directed to the MDN of the mobile station 104 can be routed to the convergent server 120 for routing through the IMS network 100 and local premises wireless gateway 108 to the mobile station 104. The responsive message to the REGNOT message is a regnot message sent at 236.

Other flows different from the FIG. 2 flow are possible. For example, some embodiments are applicable to a network-initiated authentication challenge, in which the HLR/AC initiates the authentication towards the convergent server (acting as a serving MSC). The HLR/AC sends an authentication request to the convergent server to initiate this network-initiated authentication challenge.

An efficient mechanism has been described to provide packet-switched services offered by a packet-switched services network to a subscriber of a legacy circuit-switched network. Authentication of the subscriber can be performed using the authentication infrastructure of the circuit-switched network rather than the packet-switched services network, such that the packet-switched services network does not have to be modified to support authentication of a circuit-switched network subscriber. Also, a technique is provided to register the contact address of the circuit-switched network subscriber in the circuit-switched network such that a packet-switched call directed to the subscriber can be routed through the packet-switched services network. Moreover, as noted above, authentication can be performed of a roaming mobile station that the packet-switched services network has no pre-knowledge of.

The various procedures described above can be performed by software in one or more nodes. Instructions of such software (e.g., software 130 in the convergent server 120) are executed on a processor (e.g., CPU 132). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of authenticating a mobile station in a communications network having a circuit-switched network and a packet-switched services network, comprising:
   receiving, at an intermediate server, a registration request from a local premises wireless gateway on behalf of the mobile station;
   in response to the registration request, the intermediate server performing an authentication procedure with an authentication infrastructure in the circuit-switched network, wherein the authentication infrastructure contains authentication information relating to the mobile station to enable authentication of the mobile station;
   and in response to authentication of the mobile station, sending an acknowledgment of the authentication to the local premises wireless gateway to enable the local premises wireless gateway to allow the mobile station to access packet-switched services in the packet-switched services network such that the circuit-switched network routes communications for the mobile station through the packet-switched services network to the mobile station when the authentication procedure is performed with the authentication infrastructure in the circuit-switched network.

2. The method of claim 1, wherein performing the authentication procedure with the authentication infrastructure in the circuit-switched network enables authentication of the mobile station such that the mobile station is able to access the packet-switched services through the local premises wireless gateway, even though the packet-switched services network does not contain the authentication information relating to the mobile station.

3. The method of claim 1, wherein receiving the registration request from the local premises wireless gateway comprises receiving a registration request from a femtocell base station.

4. The method of claim 1, further comprising:
   as part of the authentication procedure, the intermediate server receiving the authentication information from the authentication infrastructure of the circuit-switched network; and
   the intermediate server comparing authentication information received from the local premises wireless gateway with the received authentication information from the authentication infrastructure of the circuit-switched network to authenticate the mobile station.

5. The method of claim 1, wherein receiving the registration request at the intermediate server from the local premises wireless gateway comprises receiving a registration request over a Ut interface.

6. The method of claim 1, wherein receiving the registration request at the intermediate server from the local premises wireless gateway comprises receiving a registration request that is tunneled through the packet-switched services network.

7. The method of claim 1, wherein receiving the registration request comprises receiving a Location Update Request message.

8. The method of claim 7, wherein performing the authentication procedure by the intermediate server with the authentication infrastructure in the circuit-switched network comprises exchanging ANSI-41 messaging with the authentication infrastructure.

9. The method of claim 1, further comprising:
   receiving, at the intermediate server, a request to register a contact address of the mobile station;
   receiving, by the intermediate server, the contact address of the mobile station; and
   sending a notification containing the contact address of the mobile station to the circuit-switched network to register the contact address of the mobile station in the circuit-switched network to enable the circuit-switched network to route a call to the mobile station through the packet-switched services network.

10. The method of claim 9, wherein the request to register the contact address is received from a node in the packet-switched services network.

11. The method of claim 9, wherein sending the notification containing the contact address of the mobile station comprises sending a notification containing a mobile directory number of the mobile station.

12. The method of claim 1, wherein the receiving, performing, and sending are part of an authentication procedure that enables a roaming mobile station to be authenticated to enable access of packet-switched services in the packet-switched services network even though the packet-switched services network has no pre-knowledge of the authentication information of the roaming mobile station.

13. The method of claim 1, wherein the authentication procedure is network-initiated.

14. An article comprising a non-transitory computer readable-storage medium containing instructions that when executed cause an intermediate server to:
receive authentication messaging from a local premises wireless gateway that is able to wirelessly connect to a mobile station located in a local premises;
in response to the authentication messaging, performing an authentication exchange with an authentication infrastructure of a circuit-switched network; and
obtain information as a result of the authentication exchange; and
authenticate the mobile station based on the obtained information, wherein authentication of the mobile station allows the mobile station to access packet-switched services provided by a packet-switched services network through the local premises wireless gateway such that the circuit-switched network routes communications for the mobile station through the packet-switched services network to the mobile station when the authentication procedure is performed with the authentication infrastructure in the circuit-switched network.

15. The article of claim 14, wherein the authentication messaging is received over an Internet Protocol network between the intermediate server and the local premises wireless gateway.

16. The article of claim 14, wherein the authentication messaging is received over a Ut interface.

17. The article of claim 14, wherein the authentication messaging includes messaging tunneled through the packet-switched services network.

18. The article of claim 14, wherein the instructions when executed cause the intermediate server to further send an indication to the local premises wireless gateway that the mobile station has been authenticated to enable the local premises wireless gateway to allow the mobile station to access the packet-switched services of the packet-switched services network.

19. The article of claim 14, wherein the instructions when executed cause the intermediate server to further:
receive a request to register a mobile directory number of the mobile station;
send a notification to the circuit-switched network to register the mobile directory number of the mobile station with a home location register of the circuit-switched network such that the circuit-switched network is able to route a call directed to the mobile station through the packet-switched services network.

20. A local premises wireless gateway, comprising:
an interface to a packet-switched services network; and
a processor to:
send a registration request on behalf of the mobile station to an intermediate server to cause the intermediate server to perform an authentication procedure with an authentication infrastructure in the circuit-switched network, wherein the authentication infrastructure contains authentication information relating to the mobile station to enable authentication of the mobile station;
receive, from the intermediate server, an acknowledgment of the authentication of the mobile station; and
in response to the authentication of the mobile station, enable the mobile station to access packet-switched services in the packet-switched services network such that the circuit-switched network routes communications for the mobile station through the packet-switched services network to the mobile station when the authentication procedure is performed with the authentication infrastructure in the circuit-switched network.

21. The local premises wireless gateway of claim 20, further comprising a network interface to communicate with the intermediate server over a Ut interface or to tunnel the registration request through the packet-switched services network to the intermediate server.

\* \* \* \* \*